United States Patent [19]
Meitzner et al.

[11] Patent Number: 5,482,615
[45] Date of Patent: Jan. 9, 1996

[54] NOBLE METAL/ZN-A12O3 REFORMING CATALYSTS WITH ENHANCED REFORMING PERFORMANCE (C-2714)

[75] Inventors: George D. Meitzner, Pittstown, N.J.; Ruben A. Migone, Easton, Pa.; William J. Mykytka, Jersey City, N.J.

[73] Assignee: Exxon Research and Engineering Company, Florham Park, N.J.

[21] Appl. No.: 402,072

[22] Filed: Mar. 10, 1995

Related U.S. Application Data

[60] Continuation of Ser. No. 289,975, Aug. 12, 1994, abandoned, which is a division of Ser. No. 29,487, Mar. 11, 1993, abandoned.

[51] Int. Cl.$^6$ ............................ C10G 35/09; B01J 23/42; B01J 23/60
[52] U.S. Cl. ........................... 208/139; 502/327; 502/329
[58] Field of Search .......................... 208/139; 502/327, 502/329

[56] References Cited

U.S. PATENT DOCUMENTS

| | | | |
|---|---|---|---|
| 2,662,861 | 12/1953 | Riblett et al. | 502/250 |
| 2,728,713 | 12/1955 | Kearby et al. | 502/329 |
| 3,470,262 | 9/1969 | Michaels et al. | 502/307 |
| 3,790,504 | 2/1974 | Duhaut et al. | 208/139 |
| 3,844,935 | 10/1974 | Drehman et al. | 208/79 |
| 3,857,780 | 12/1974 | Gustafson | 502/527 |
| 3,868,317 | 2/1975 | Itoh et al. | 502/226 |
| 3,871,995 | 3/1975 | Duhaut et al. | 208/139 |
| 3,875,048 | 4/1975 | Iwaisaki et al. | 502/226 |
| 3,883,418 | 5/1975 | Drehman et al. | 208/66 |
| 3,951,782 | 4/1976 | Buss | 208/139 |
| 4,005,048 | 1/1977 | Dowden et al. | 502/226 |
| 4,061,592 | 12/1977 | Buss | 208/139 |
| 4,082,697 | 4/1978 | Tamm | 502/334 |
| 4,115,252 | 9/1978 | Antos | 502/230 |
| 4,137,153 | 1/1979 | Antos | 208/139 |
| 4,179,353 | 12/1979 | Hutson, Jr. et al. | 208/65 |
| 4,179,406 | 12/1979 | Antos | 502/226 |
| 4,190,521 | 2/1980 | Antos | 502/226 |
| 4,190,557 | 2/1980 | Antos | 502/329 |
| 4,210,561 | 7/1980 | Antos | 502/226 |
| 4,238,363 | 12/1980 | Antos | 502/329 |
| 4,238,365 | 12/1980 | Antos | 502/226 |
| 4,298,462 | 11/1981 | Antos | 208/139 |
| 4,403,104 | 7/1984 | Antos et al. | 208/139 |
| 4,741,820 | 5/1988 | Coughlin et al. | 208/138 |
| 5,073,662 | 12/1991 | Olbrich | 585/660 |

FOREIGN PATENT DOCUMENTS

| | | |
|---|---|---|
| 781856 | 7/1972 | Belgium . |
| 1014882 | 8/1977 | Canada . |
| 2127310 | 10/1972 | France . |
| 2234924 | 2/1975 | France . |
| 2438678 | 6/1980 | France . |
| 2481144 | 10/1981 | France . |
| 2483253 | 12/1981 | France . |
| 49-040700 | 11/1974 | Japan . |
| 51-094490 | 8/1976 | Japan . |
| 54-057489 | 5/1979 | Japan . |

OTHER PUBLICATIONS

Alkane conversion and topological segregation in PtM/Al$_2$O$_3$ catalysts, Cog., Applied Catalysts A: General, 82 (1992) 231–245.

Promotor action mechanism in hydrocarbon dehyrogenation bimetallic platinum catalysts, Bursian, et al., 8th International Congress on Catalysis Proceedings vol. II (1984).

Studies on Metal–Semiconductor Interaction over Pt–ZnO and Pt–TiO$_2$, Wenzhao, et al., 8th International Congress on Catalysis, vol. V, 205 (1984).

Influence of alloying platinum for the hydrogenation of p–chloronitrobenzene over PtM/Al$_2$O$_3$ catalysts with M=Sn, Pb, Ge, Al, Zn, Coq, et al., Journal of Molecular Calaysis, 71 (1992) 317–333.

Surface Spectroscopic Characterization of the internation between Zinc Ions and–Alumina, Strohmeier, et al., Journal of Catalysis, 86, 266–279 (1984).

*Primary Examiner*—E. Rollins Cross
*Assistant Examiner*—Timothy H. Meeks
*Attorney, Agent, or Firm*—Estelle C. Bakun

[57] ABSTRACT

Catalysts for reforming typically contain platinum supported on a high surface area alumina. During reforming reactions, specifically dehydrocyclization, such catalysts produce undesirable light gases. Applicants have found a new catalyst that suppresses undesirable hydrogenolysis reactions thereby decreasing the yields of undesirable light gas make during dehydrocyclization of $C_6+$ hydrocarbons, especially n-heptane. The catalyst comprises a halogen, and catalytically active amounts of nonalloyed noble metal and zinc on an alumina support wherein said noble metal is selected from the group consisting essentially of Pt, Pd, Ir, Os, Ru, Rh, Re, and mixtures thereof and in the absence of cobalt and nickel. As used herein, nonalloyed means that the metallic phase consists of a single metallic element. In the present invention, noble metal. The invention is further directed to the preparation and use of the catalyst in a reforming reaction.

3 Claims, 1 Drawing Sheet

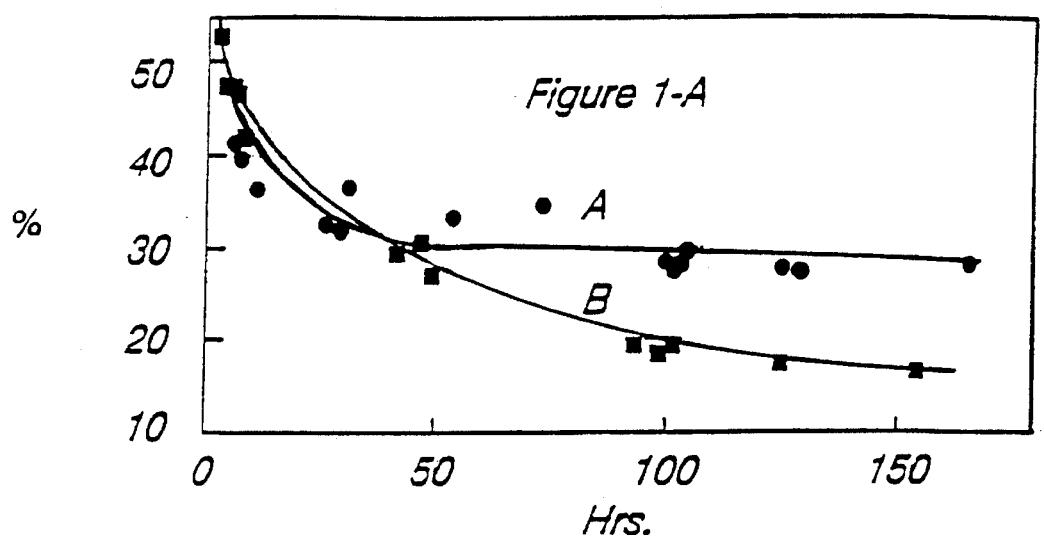
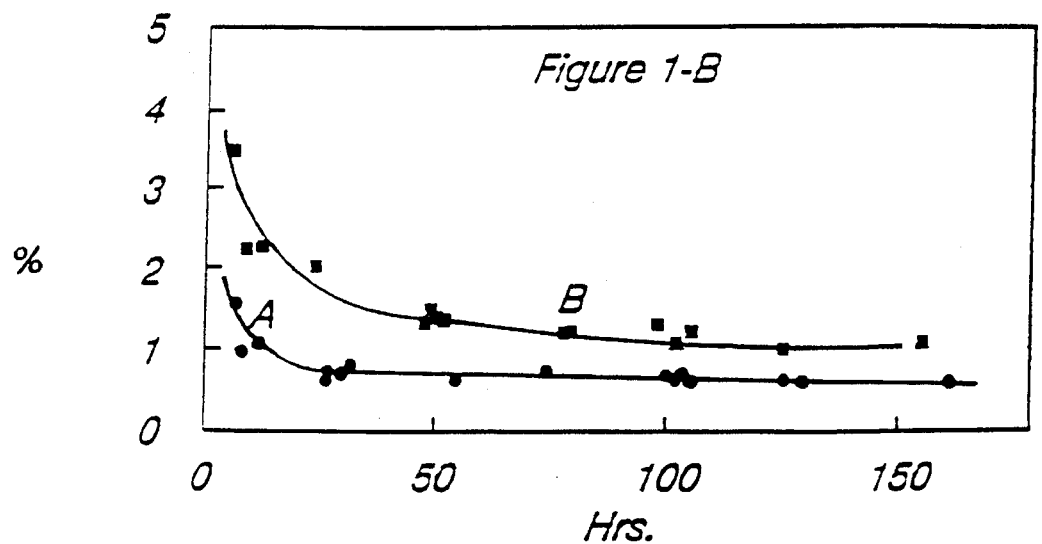
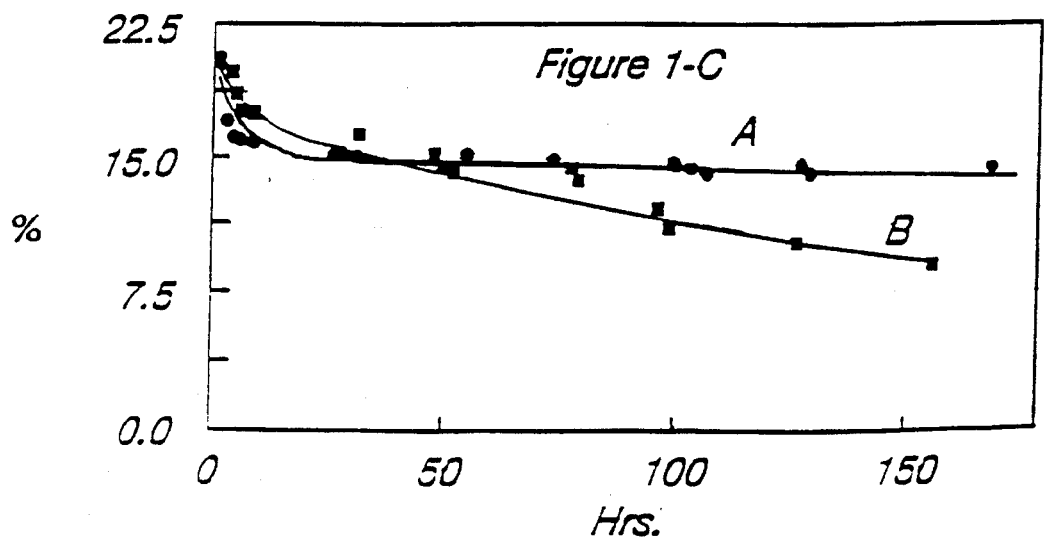

NOBLE METAL/ZN-A1203 REFORMING CATALYSTS WITH ENHANCED REFORMING PERFORMANCE (C-2714)

This is a continuation of application Ser. No. 289,975 filed Aug. 12, 1994, now abandoned, which is a division of application Ser. No. 029,487 filed Mar. 11, 1993, now abandoned.

FIELD OF THE INVENTION

This invention is directed to a reforming catalyst and its use in a reforming process, especially a dehydrocyclization process.

SUMMARY OF THE INVENTION

Catalysts for reforming typically contain platinum supported on a high surface area alumina. During reforming reactions, specifically dehydrocyclization, such catalysts produce undesirable light gases. Applicants have found a new catalyst that suppresses undesirable hydrogenolysis reactions thereby decreasing the yields of undesirable light gas made during dehydrocyclization of $C_6+$ hydrocarbons, especially n-heptane. The catalyst comprises a halogen and catalytically active amounts of nonalloyed noble metal and zinc on an alumina support wherein said noble metal is selected from the group consisting essentially of Pt, Pd, Ir, Os, Ru, Rh, Re, and mixtures thereof and in the absence of cobalt and nickel. As used herein, nonalloyed means that the metallic phase consists substantially (more than 90%, preferably more than 99%) of a single metallic element. In the present invention, noble metal.

The invention is further directed to the preparation and use of the catalyst in a reforming reaction.

BRIEF DESCRIPTION OF THE DRAWINGS

FIG. 1A shows the toluene yield vs. time on-oil in hours during n-heptane reforming for a present invention catalyst (0.3% Pt/0.3% Zn-alumina) and a typical platinum on alumina catalyst (0.3% Pt/alumina), represented by lines A and B respectively. The toluene yield for the present invention catalyst reached a steady state after 48 hours on oil and then remained practically constant while the platinum on alumina catalyst steadily decreased during the time on oil. The y-axis is mol% of toluene yield and the x-axis time on-oil in hours.

FIG. 1B shows the methane yield comparison for the same catalysts as FIG. 1A as a function of time on-oil. The y-axis is mol% of methane and the x-axis time on-oil in hours.

FIG. 1C is a comparison of the fraction of hydrogen introduced as n-heptane that is released as $H_2$ as a function of time on-oil. The y-axis is mol% and the x-axis time on-oil in hours.

DETAILED DESCRIPTION OF THE INVENTION

The invention disclosed herein may suitably comprise, consist, or consist essentially of the elements thereof disclosed herein.

The present invention adds an amount of zinc prior to or during the incorporation of a noble metal onto a Group VIII noble metal alumina reforming catalyst to increase dispersion of the noble metal and decrease the yield of undesirable light gases produced during dehydrocyclization of $C_6+$ hydrocarbons, especially n-heptane. Use of the present invention catalyst in a reforming process affords increased $C_5+$ selectivity of at least about 3%, reduced methane make of at least about 40%, and increased $H_2$ yields of at least about 43% when compared to a commercial $Pt/Al_2O_3$ catalyst.

The support utilized for the present catalyst is an alumina support. The alumina support may be prepared by any of a number of conventional methods known to those skilled in the art. Alternatively, the alumina support may be purchased from commercial sources. Preferably the alumina will be gamma or eta alumina. The aluminas of the present invention have surface areas of at least about 100 $m^2/g$.

Prior to addition of either noble metal or zinc, the alumina support may be calcined in air at a temperature ranging from about 200° C. to about 600° C. Such preliminary calcination is preferred. The support is then impregnated with a solution containing noble metal and zinc salts. Preferably, the impregnation will be carried out sequentially with zinc impregnation preceding noble metal impregnation. It is important that the noble metal not be incorporated first, since undesirable alloying will occur between the zinc and noble metal in such a case.

The amount of zinc impregnated onto the catalyst support ranges from about 0.01 wt % to about 1 wt %. Preferably 0.3 wt % zinc will be incorporated onto the alumina support. The zinc of the instant catalyst is present in the divalent (+2) state. It is important that the zinc not be reduced to the metal or zero valence state in practicing this invention.

The amount of noble metal impregnated onto the catalyst support ranges from 0.1 wt % to about 1 wt %. Preferably 0.3 wt % noble metal will be incorporated onto the alumina support. Preferably platinum will be the noble metal utilized. Other suitable noble metals include palladium, iridium, rhodium, osmium, rhenium, ruthenium, and mixtures thereof.

Typically, the noble metal and zinc are added to the alumina support in the form of a salt e.g. $ZnCl_2$ and $H_2PtCl_6$. The noble metal and zinc may be coimpregnated or sequentially impregnated, with sequential impregnation of zinc first being preferred. The impregnation may be accomplished via the incipient wetness technique or other techniques known to those skilled in the art. An adsorption technique from a dilute or concentrated solution, or evaporation, may also be used. For example, the alumina support can be stirred at room temperature in the solution containing zinc or both zinc and noble metal and then allowed to stand overnight, before decanting and washing the alumina. The solution used in impregnating the support e.g. can be a neutral salt or acid solution having the respective component or components dissolved therein. If, e.g. $ZnCl_2$ is used, the solution should be acidic to facilitate dissolution of the salt. This would be readily determinable by one skilled in the art. Suitable zinc and noble metal salts are e.g. all soluble zinc salts such as zinc acetate, zinc chloride, zinc bromide, zinc fluoride, zinc carbonate, zinc nitrate or any other soluble zincate salt known to those skilled in the art, and any of the soluble noble metal salts or complexes such as ammonium chloroplatinate, dinitrodiamino platinum, chloroplatinic acid, bromoplatinic acid or any of the other soluble noble metal salts or complexes known to those skilled in the art. It is preferred to use the halide salts of zinc and noble metal to incorporate the necessary halide of the composition in a single step. Preferably the chloride salts will be used.

The catalyst of the present invention will also contain an amount of halogen. Preferably the catalyst will contain about 0.5 to about 1.2 Wt% chlorine, preferably about 0.7

Wt% chlorine, or equivalent amounts of fluorine and bromine calculated on an atomic basis. The halogen may be incorporated onto the catalyst at any suitable stage of catalyst manufacture, e.g. prior to, during or following the incorporation of Group VIII noble metal and zinc. The halogen may likewise be incorporated during the reforming process along with the feed by adding volatile, usually organic halogens during the process. Generally, the halogens can be combined with the catalyst by contact with a suitable compound such as hydrogen chloride or fluoride or ammonium chloride or fluoride either in gaseous form or in water soluble form. Preferably the halogen is incorporated onto the catalyst by impregnating with a solution of a halogen compound with noble metal, or a halogen compound with zinc. Thus, for example, impregnation with zinc chloride or chloroplatinic acid will result in chlorine addition to the catalyst.

The impregnation can be carried out under a variety of conditions known to those skilled in the art including ambient and elevated temperatures, and atmospheric and superatmospheric conditions. The impregnated support is then dried at about 100° C. to about 150° C. preferably 110° C. for about one to about 3 hours. The dried impregnated support is then calcined at a temperature of about 300° C. to about 650° C., preferably 600° C. for about 1 to about 6 hours, preferably about three hours. The drying may be conducted in the presence of oxygen, nitrogen or both, in an air stream, or under vacuum. Calcination can be conducted in the presence of nitrogen or oxygen, in an air stream, or in the presence of an inert gas or a mixture of oxygen and an inert gas.

When the zinc and noble metal of the present catalyst are added to the alumina support sequentially, the alumina support is impregnated with zinc followed by drying and calcination. The zinc containing alumina support is then impregnated with noble metal dried and calcined. Both drying and calcination steps are conducted under the same conditions as described for coimpregnation of the alumina. As used herein, drying followed by calcination is referred to as activating.

Applicants believe that coimpregnation or sequential impregnation of the zinc component of the catalyst causes the formation of $ZnAl_2O_4$ surface-like spinels, preventing reduction of the zinc to zinc metal, thereby preventing the formation of undesirable noble metal-zinc alloy. (See e.g., "Surface Spectroscopic Characterization of the Interaction Between Zinc Ions and γ-Alumina," Strohmeier and Hercules, Journal of Catalysis 86, 266–279 (1984).) The noble metal attaches to the $Zn^{+2}$ of the spinel aiding in dispersion of the noble metal. A small amount of zinc not forming surface like spinels will remain as ZnO and can form a small amount of alloy with the noble metal.

Zinc which fails to enter the $ZnAl_2O_4$ surface-like spinel phase during calcination, but remains as ZnO, is reducible and can migrate onto Pt clusters or form PtZn alloys. These are detrimental to the catalysts performance. ZnO is selectively removed from an intimate mixture of ZnO and $ZnAl_2O_4$, such as is formed by incomplete reaction of ZnO with $Al_2O_3$, by washing with aqueous ammonia solutions, e.g. $(NH_4)_2CO_3$ (See Strohmeier & Hercules).

Washing the zinc-impregnated and calcined $Al_2O_3$ with aqueous ammonium carbonate selectively removes residual ZnO, resulting in a catalyst that is stabilized with respect to migration or reduction of zinc, and consequent loss of activity. Whether sequential or coimpregnation of zinc is employed, the washing step must follow calcination. For a coimpregnated catalyst, the catalyst must be rehalogenated by any method known to those skilled in the art. For a sequentially impregnated catalyst, the catalyst must also be rehalogenated but such rehalogenation can be achieved during platinum impregnation via e.g. chloroplatinic acid or by any other technique known to those skilled in the art.

The concentration of ammonium solutions and washing temperatures are readily determinable by those skilled in the art. For example, 0.1 to 1M $(NH_4)_2CO_3$ at ambient temperature can be used.

The amount of ZnO present on the catalyst prior to washing is an insignificant amount which will not significantly hinder the activity of the present invention catalyst if the washing step is not performed during preparation. However, the washing step is preferred to prevent any possible alloy formation between platinum and zinc and to enhance further the platinum dispersion. ZnO will be present in amounts representing less than 10%, preferably less than 1% of the Zn in the catalyst prior to washing.

The catalysts of the present invention can be contacted with a feedstream comprising $C_6+$. When utilized in the reforming process, the feedstream will preferably be $C_6$ to C 232° C. hydrocarbons.

In a catalytic reforming process, a hydrotreated naphtha stream comprising $C_6+$, preferably $C_6$ to 232° C. hydrocarbons, that typically contain about 20 to 80 volume % paraffins, 20–80 volume % naphthenes, and about 5–20 volume % aromatics, and boiling at atmospheric pressure between 27° C. and 232° C., preferably between about 66° C. and 191° C., is brought into contact with the catalyst composition of the present invention in the presence of hydrogen. The reaction typically takes place in the vapor phase at a temperature ranging from about 350° to 550° C. preferably about 400° to 530° C. Reaction zone pressures may range from about 1 to 50 atmospheres, preferably from 3 to 25 atmospheres.

The naphtha feedstream is generally passed over the catalyst at space velocities ranging from about 0.5 to 20 parts by weight of naphtha per hour per part by weight of catalyst (w/w/hr), preferably from about 1 to about 10 w/w/hr. The hydrogen to hydrocarbon mole ratio within the reaction zone is maintained between about 0.5 and 20, preferably between about 1 and 10. During the reforming process, the hydrocarbon employed can be in a mixture with light paraffinic gaseous hydrocarbons. Since the reforming process produces large quantities of hydrogen, a recycle stream is employed for admission of hydrogen with the feed.

The following examples are illustrative of the invention though not limiting.

EXAMPLE 1

Preparation of Platinum-Zinc-Alumina Catalyst by Coimpregnation

A solution containing 0.0133 g Zn/g sol. was prepared by dissolving 0.68 g of $ZnCl_2$ in 23.3 mL of aqueous HCl(0.062M). 4.584 g of this zinc solution was added to 0.0620 g of a water solution of $H_2PtCl_6$(0.98 g Pt/g sol.) and diluted to 28 mL. A clear yellow solution was obtained. 20.18 g of pre-calcined gamma-alumina extrudate pellets was added. The mixture was stirred for fifteen minutes and then allowed to stand overnight at room temperature.

The resulting mix was a clear colorless overstanding liquid with yellow extrudates and fine powder sediment. The extrudate and sediment was collected by filtration and washed several times with distilled water. The yellow extrudate (19.46 g) was dried for three hours at 110° C., and then calcined for 3 hours at 500° C. or 600° C. as indicated in the tables. The yellow calcined extrudate was stored for future use.

EXAMPLE 2

Preparation of Platinum-Zinc-Alumina Catalyst by Sequential Impregnation

A solution containing 0.0133 g Zn/g sol. was prepared by dissolving 0.68 g $ZnCl_2$ in 23.3 mL aqueous HCL (0.062M). 4.584 g of this zinc chloride solution was diluted to 28 mL. 20.18 g of pre-calcined gamma-alumina extrudate pellets was added to the the zinc chloride solution. The mixture was stirred for fifteen minutes and then allowed to stand overnight at room temperature.

The solution was decanted, and the white extrudates were washed with 20 mL of distilled water, decanted again, and dried in air for 3 hours at 110° C. Afterwards, the sample was calcined in flowing air at 500° C. for 3 hours.

The white extrudates (20 g) were added to a solution of $H_2PtCl_6$ (0.98 g Pt/g sol.) diluted to 28 mL. The mixture was stirred for 15 minutes and then allowed to stand overnight at room temperature. The solution was decanted, and the yellow extrudates were washed several times with distilled water, decanted and dried for 3 hours at 110° C. The sample was then calcined in flowing air at 500° C. for 3 hours.

EXAMPLE 3

Measurement of Platinum Dispersion

Hydrogen and oxygen chemisorptions were used to determine the fraction of surface platinum (dispersion) which should be maximized and maintained: for efficient use of the metal and for best catalyst performance.

The chemisorption measurements were performed by the static volumetric method as follows. The sample was evacuated at room temperature, then heated in flowing hydrogen at 10° C. min$^{-1}$ from room temperature to 475° C. After 2 hours at 475° C., the temperature was lowered to 450° C. in hydrogen, and the sample was evacuated 60 min to below $10^{-3}$ Torr. Finally the sample was cooled to 35° C. and evacuated for another 30 min to below $10^{-5}$ Torr. The isotherms comprised five points evenly spaced to about 250 Torr. After one isotherm, which measured total uptake, the sample was evacuated 15 minutes. A second isotherm, also at 35° C., measured the weakly held fraction of adsorbate. The strongly adsorbed hydrogen or oxygen was the difference between the zero intercepts, extrapolated from the linear regions of the two isotherms.

TABLE I $H_2/O_2$ CHEMISORPTION FOR 0.3 WT % Pt ON ALUMINA WITH DIFFERENT ZINC LOADINGS

| ZINC LOADING | $T_c$ = 500° C. | | $T_c$ = 600° C. | |
| --- | --- | --- | --- | --- |
| WT % | H/M | O/M | H/M | O/M |
| 0 | 0.58 | 0.60 | 0.70 | 0.65 |
| 0.08 | 0.77 | 0.72 | 0.81 | 1.02 |
| 0.17 | 0.88 | 0.77 | 0.88 | 1.06 |
| 0.30 | 0.88 | 0.86 | 0.80 | 0.75 |
| 0.30* | 0.78 | 0.73 | 0.86 | 0.83 |
| 0.30** | 0.00 | 0.00 | 0.00 | 0.00 |

TABLE I-continued $H_2/O_2$ CHEMISORPTION FOR 0.3 WT % Pt ON ALUMINA WITH DIFFERENT ZINC LOADINGS

| ZINC LOADING | $T_c$ = 500° C. | | $T_c$ = 600° C. | |
| --- | --- | --- | --- | --- |
| WT % | H/M | O/M | H/M | O/M |

*prepared by sequential impregnation
**The sample does not contain platinum
$T_c$ = temperature of calcination The results indicate that all of the Pt/Zn—$Al_2O_3$ samples had adsorption capacities higher than a standard 0.3 wt % Pt/$Al_2O_3$ sample. Also, catalysts calcined at 600° C. and 500° C. had similar adsorption capacities. The catalysts were prepared in accordance with the methods of examples 1 and 2 by adjusting the amount of zinc contained in the impregnating solution.

EXAMPLE 4

The catalyst was tested in an ethane hydrogenolysis reaction. The data were obtained in a flow reactor system at atmospheric pressure using a vertically mounted stainless steel reactor tube, 0.8 cm internal diameter and 8.0 cm in length. Before any reaction rate measurement the catalyst was reduced under flowing hydrogen for 2 hrs at 475° C. The ethane, 30 mL/min, hydrogen, 200 mL/min, and helium, 700 mL/min, were passed downflow through a bed containing 200 mg of catalyst, 40–60 mesh, diluted with 500 mg Vycor glass, 40–60 mesh. The total gas flow was maintained at 1 L min$^{-1}$ throughout the run. In a run the reactant gases were passed for a period of five minutes prior to sampling the reaction products for GC analysis. Ethane was then discontinued and the hydrogen flow continued for fifteen minutes prior to another reaction period at a temperature of 7°–10° C. higher. Rates were measured as the reaction temperature was increased, and again as it was decreased to check reproducibility of results and to detect any deactivation. The results are presented in Table II. The temperature necessary to obtain 1% ethane conversion was chosen for comparison of catalytic activities. The catalysts were prepared as in example 1 by adjusting the amount of zinc contained in the impregnating solution.

TABLE II

EFFECT OF ZINC LOADING ON ETHANE CONVERSION TO METHANE BY HYDROGENOLYSIS (*)
All of the catalysts were prepared by coimpregnation.

| ZINC LOADING WT % | TEMPERATURE FOR 1% ETHANE CONVERSION | TEMPERATURE CALCINATION °C. |
| --- | --- | --- |
| 0 | 376 | 500 |
| 0.08 | 403 | 500 |
| 0.17 | 421 | 500 |
| 0.30 | 455** | 500 |
| 0 | 385 | 600 |
| 0.08 | 401 | 600 |
| 0.17 | 418 | 600 |
| 0.30 | 436 | 600 |

(*) $H_2/C_2H_6/He$ = 200/30/70, 1 atm., pre-reduced at 475° C., All catalysts contain 0.3 wt % Pt with no presulfidation.
(**) Unstable; temperature obtained by extrapolation.

The results show that the suppression of hydrogenolysis activity correlated with zinc loading. Catalysts calcined at 500° C. and 600° C. showed the same trend and similar activities, although the 0.3 Pt/0.3Zn—Al$_2$O$_3$ catalyst was more stable when calcined at 600° C.

EXAMPLE 5

The catalyst of Table II were also tested for n-heptane dehydrocyclization activity and compared against a standard 0.3 wt % Pt/Al$_2$O$_3$ commercial catalyst (See Table III and FIG. 1).

Six grams of catalyst extrudates were placed halfway through the reaction vessel, a 56 cm long by 1.0 cm internal diameter stainless steel tube. Quartz beds were placed before and after the catalyst bed to homogenize the reactant mixture and temperature. Pure n-heptane, 17.9 g h$^{-1}$, and the hydrogen necessary to obtain a ratio of hydrogen:oil of 3 were fed downflow. The pressure was kept at 75 psi throughout. Prior to any reaction measurement the catalyst was reduced under flowing hydrogen by heating from room temperature to 310° C. in 3 hrs, soaking at this temperature for 30 minutes, ramping to 510° C. in 2 hours, held at 510° C. for 5 hours, then lowered to 370° C. At this point the hydrogen and n-heptane flows were set. The reaction temperature, 500° C. was reached in 3 hours. Each run lasted about 180 hours. The results are tabulated in Table III and graphically represented in FIG. 1.

TABLE III

| Wt % Zn in 0.3 Wt % Pt/Zn—Al$_2$O$_3$ | Toluene Yield MOLE % | Methane Yield MOLE % |
| --- | --- | --- |
| 0.00(*) | 18 | 1.1 |
| 0.08 | 22 | 0.75 |
| 0.17 | 23 | 0.63 |
| 0.30 | 30 | 0.56 |
| 0.62 | 29 | 0.61 |

(*) Commercial 0.3 wt % pt/Al$_2$O$_3$ catalyst
Performance comparison at 100 hours time on oil for n-heptane reforming. T = 500° C., P = 75 psig, H$_2$/oil = 3, WHSV = 2.

The results in Table III and FIG. 1 show that the addition of Zn decreased hydrogenolysis and improved the dehydrocyclization activity on n-heptane, reflected in low light gases and high toluene yields. Moreover, the toluene yield remained practically constant from the present invention catalyst, while it continued to decline from Pt/Al$_2$O$_3$, during the period from 50 hrs to 180 hrs after the start of the run.

EXAMPLE 6

A commercially available 0.3 Wt% Pt/Al$_2$O$_3$ catalyst was impregnated with varying levels of zinc to show the importance of incorporating zinc first or simultaneously with the noble metal. The zinc was incorporated onto the commercial catalyst as described in Example 1. The results for an n-heptane reforming reaction are tabulated in Table IV. The run conditions were as specified for Example 5.

TABLE IV

| Wt % Zn added to Pt/Al$_2$O$_3$ | Toluene Yield MOLE % | Methane Yield MOLE % |
| --- | --- | --- |
| 0.00 | 19 | 1.2 |
| 0.08 | 20 | 1.4 |
| 0.30 | 22 | 1.3 |
| 0.60 | 17 | 1.6 |

100 h time on oil for n-heptane reforming, T = 500° C., P = 75 psig, H$_2$/oil = 3, WHSV = 2.

Comparison of Tables III and IV show the different results obtained when platinum is first added to the alumina support followed by zinc. Toluene yield is significantly increased and methane yield decreased when employing the present invention catalysts.

Table V shows the H/Pt uptakes when Zn is added to a 0.3 wt % Pt/Al$_2$O$_3$ catalyst demonstrating that Zn addition following platinum addition does not provide enhanced platinum dispersion (See Table 1).

TABLE V

| Zn loading (wt %) | H/Pt |
| --- | --- |
| 0.0 | 0.61 |
| 0.08 | 0.63 |
| 0.30 | 0.61 |
| 0.61 | 0.56 |

What is claimed is:

1. A catalytic reforming process with enhanced C$_5$+ selectivity, under reforming conditions which includes dehydrocyclization of at least a portion of a naphtha feedstream comprising: contacting said naphtha feedstream with a catalyst composition consisting essentially of a halogen and catalytically active amounts of nonalloyed platinum and zinc on an alumina support and in the absence of cobalt and nickel.

2. A process according to claim 1 wherein said feedstream is a C$_5$+ feedstream.

3. A process according to claim 1 wherein said feedstream is a C$_6$ to C 232° C. feedstream.

\* \* \* \* \*